United States Patent [19]

Briggs

[11] Patent Number: 6,022,459
[45] Date of Patent: Feb. 8, 2000

[54] LIQUID PURIFICATION APPARATUS

[75] Inventor: William Ernest Briggs, Grovedale, Australia

[73] Assignee: Austech Pty Ltd., Richmond, Australia

[21] Appl. No.: 09/020,950

[22] Filed: Feb. 9, 1998

[30]     Foreign Application Priority Data

Feb. 10, 1997 [AU] Australia ................................. PO5022

[51] Int. Cl.[7] ............................ C25B 15/00; C25D 21/00
[52] U.S. Cl. .................................... 204/228.4; 204/229.6; 204/275; 204/600
[58] Field of Search ................................ 204/228.4, 275, 204/229.6, 600

[56]             References Cited

U.S. PATENT DOCUMENTS

| | | | |
|---|---|---|---|
| 2,105,835 | 1/1938 | Krause | 99/220 |
| 3,654,119 | 4/1972 | White et al. | 204/228 |
| 4,119,517 | 10/1978 | Hengst | 204/229 |
| 4,525,253 | 6/1985 | Hayes et al. | 204/149 |
| 4,734,176 | 3/1988 | Zemba, Jr. et al. | 204/149 |
| 4,936,979 | 6/1990 | Brown | 210/85 |
| 5,252,192 | 10/1993 | Ludwig | 204/228 |
| 5,306,409 | 4/1994 | Arai | 204/228 |

FOREIGN PATENT DOCUMENTS

| | | |
|---|---|---|
| 146126 | 7/1949 | Australia . |
| 40301 | 9/1978 | Australia . |
| 69875 | 3/1987 | Australia . |
| 0128782 A1 | 12/1984 | European Pat. Off. . |
| 605421 | 9/1978 | Switzerland . |
| 432101 | 7/1935 | United Kingdom . |
| 1154117 | 6/1969 | United Kingdom . |
| 2270395 | 3/1994 | United Kingdom . |
| 89/08081 | 9/1989 | WIPO . |
| 90/10734 | 9/1990 | WIPO . |
| 93/05861 | 4/1993 | WIPO . |

OTHER PUBLICATIONS

Search Report for EP 95 91 8456, Apr. 1997.
Patent Abstract for JP 5–245478 A "Method and Apparatus for Treating Cooling water of Cooling Tower", Sep. 1993.
Patent Abstract for JP 4–90886 A "Water Sterilizing Apparatus", Mar. 1992.
Patent Abstract for JP 59–189988 A "Controlling Mechanism for Volume of Water in Continuous Water Electrolysis Unit", Oct. 1984.

*Primary Examiner*—Kathryn Gorgos
*Assistant Examiner*—Wesley A. Nicolas
*Attorney, Agent, or Firm*—Gary M. Nath; Harold L. Novick; Nath & Associates

[57]             ABSTRACT

The invention relates to a liquid purification apparatus (10) adapted to employ the purifying effects of the heavy metal silver under electrolysis. The apparatus (10) has a chamber (14) formed with spaced apart inlet and outlet openings (16,18) whereby liquid can flow through chamber (14) from inlet opening (16) to outlet opening (18). An electrolytic unit (20) has at least two spaced apart silver electrodes (22,24) mounted in chamber (14) in the path of the liquid flow. An electric circuit means (32) controls operation of electrodes (22,24) with a first timing means (62) for providing a pulsed current to electrodes (22,24).

15 Claims, 5 Drawing Sheets

6,022,459

1

LIQUID PURIFICATION APPARATUS

TECHNICAL FIELD OF THE INVENTION

This invention relates to liquid purification apparatus and methods of using same and relates particularly to liquid anti-microbial apparatus and methods of using same.

The apparatus is not directed to any particular liquid, however one of its more common uses would be in producing water that is capable of destroying environmental pathogens in drinking water, or to treat the water and many other liquids for consumption or recreational use. Such liquids may include fruit juices, milk, syrups, etc. This invention can be described as a liquid anti-microbial apparatus for the treatment of liquids for both purification of the liquid and the ability to preserve such liquids. As blood is also a liquid, the invention can produce anti-microbial solutions for the decontamination of mammalian blood by sub-lingual absorption. It will become more apparent that the invention is not only limited to the above particular field of use but has even wider application in surface decontamination and many other applications are possible.

BACKGROUND OF THE INVENTION

It is well known and documented in prior patent specifications of the ability of silver ions to effectively destroy micro-organisms. However, in all prior art, silver that has been used in the application of liquid purification has been based on the production of silver salts. Silver salts are either added to the liquid or chemically manufactured in situ by electrolysis. The use of silver using electrolysis is described in Australian Patent No. 685630 and International Patent Application No. PCT/AU96/00768, the contents of which are herein incorporated into this specification. With either chemical or electrical introduction of silver to the liquid, the salts and ions produced were quickly used up to perform the purification effect. In many cases, salts such as silver chloride which are basically insoluble, could precipitate out as sediment and would not be carried with the liquid. In many cases where the liquid was to be treated, prior to filtering, the silver more often than not, came into contact with chlorine causing the production of silver iodide (a chemical effective in seeding clouds). Silver iodide has a tendency to plate out on surrounding elements and tends to be left behind and again is not carried with liquid.

It is a well known fact that most silver compounds are light sensitive and tend to plate out, hence they are used in practically all photographic and X-ray processes. This particular attribute of silver can become detrimental when silver is used as a potable purifier, where plating out for instance can cause staining, eg swimming pools and spas and discolouration in clear liquids.

In the prior art the above mentioned problems were basically considered natural silver reactions which restricted the natural anti-microbial ability of silver in specific applications. To eliminate the problem would mean eliminating the silver. In drinking water, specific tolerances of silver have been recommended by health authorities such as FDA (Federal Drug Administration), WHO (World Health Authority) and EPA (Environmental Protection Agency) to minimise the effect of silver salts which can cause a side effect called Argeria. Argeria is a discolouration of the skin when overdosing of silver occurs. The above recommendations and legislation has made it nearly impossible to derive the maximum potential of silver as an anti-microbial element even though the skin discolouration has been proven to be completely harmless.

OBJECT OF THE INVENTION

The principal object of this invention is to provide apparatus which will ameliorate the problems associated with the prior art by effectively producing suspended silver particles. Such particles are not effected by light, are not soluble and cannot plate out and, in turn, as the particles are of pure silver and not silver salts, they will not produce skin discolouration if ingested in high doses.

A further preferred object of the invention is to provide apparatus which will charge the particles with an electrical charge that will remain constant within the particles.

Another preferred object of the invention is to produce charged particles of silver small enough to be adsorbed into tissue or into the blood stream sub-lingually for therapeutic value.

SUMMARY OF THE INVENTION

With these objects in view the present invention provides a liquid purification apparatus adapted to employ the purifying affects of the heavy metal silver under electrolysis, said apparatus including a chamber formed with spaced apart inlet and outlet openings whereby liquid may be caused to flow through the chamber from said inlet opening to said outlet opening, at least one electrolytic unit, each electrolytic unit including at least two spaced apart silver electrodes mounted in said chamber in the path of said liquid flow, at least one of said electrodes being an anode and at least one of said electrodes being a cathode, and electric circuit means for controlling operation of said electrodes, said electric circuit means including a first timing means for providing a pulsed current to said electrodes.

Preferably said circuit means includes a second timing means to cyclically reverse the polarity of said anode(s) and cathode(s) to effect a self-cleaning of said anode(s) and cathode(s). In a preferred aspect of the invention the pulsed current is at a frequency of between 9–11 kHz and the polarity reversal occurs every 1 to 4 seconds.

Preferably the pulse is a square wave pulse.

In a practical embodiment each electrolytic unit includes a single anode having a pair of cathodes at equal distances on opposite sides of said anode, said anode and cathodes being spaced apart along said liquid flow path.

Another preferred aspect of the invention is to use a specific frequency of current and voltage so as to produce silver particles of a size that will remain suspended in a liquid that does not require high viscosity, preservatives or stabilizers, e.g., deionized water.

The invention will provide an apparatus for the in situ production of silver particles suspended in a liquid for the purpose of microbial decontamination of liquids. Furthermore, the production of such silver particles will act as a natural preservative against any micro-organism that may re-contaminate such liquid.

BRIEF DESCRIPTION OF THE DRAWINGS

In order that the invention may be more readily understood and put into practical effect, reference will now be made to the accompanying drawings, wherein.

DESCRIPTION OF THE PREFERRED EMBODIMENTS

The preferred embodiment can be readily incorporated into the apparatus shown in Australian Patent No. 685630 which has been previously incorporated into this specification.

Figure 1:
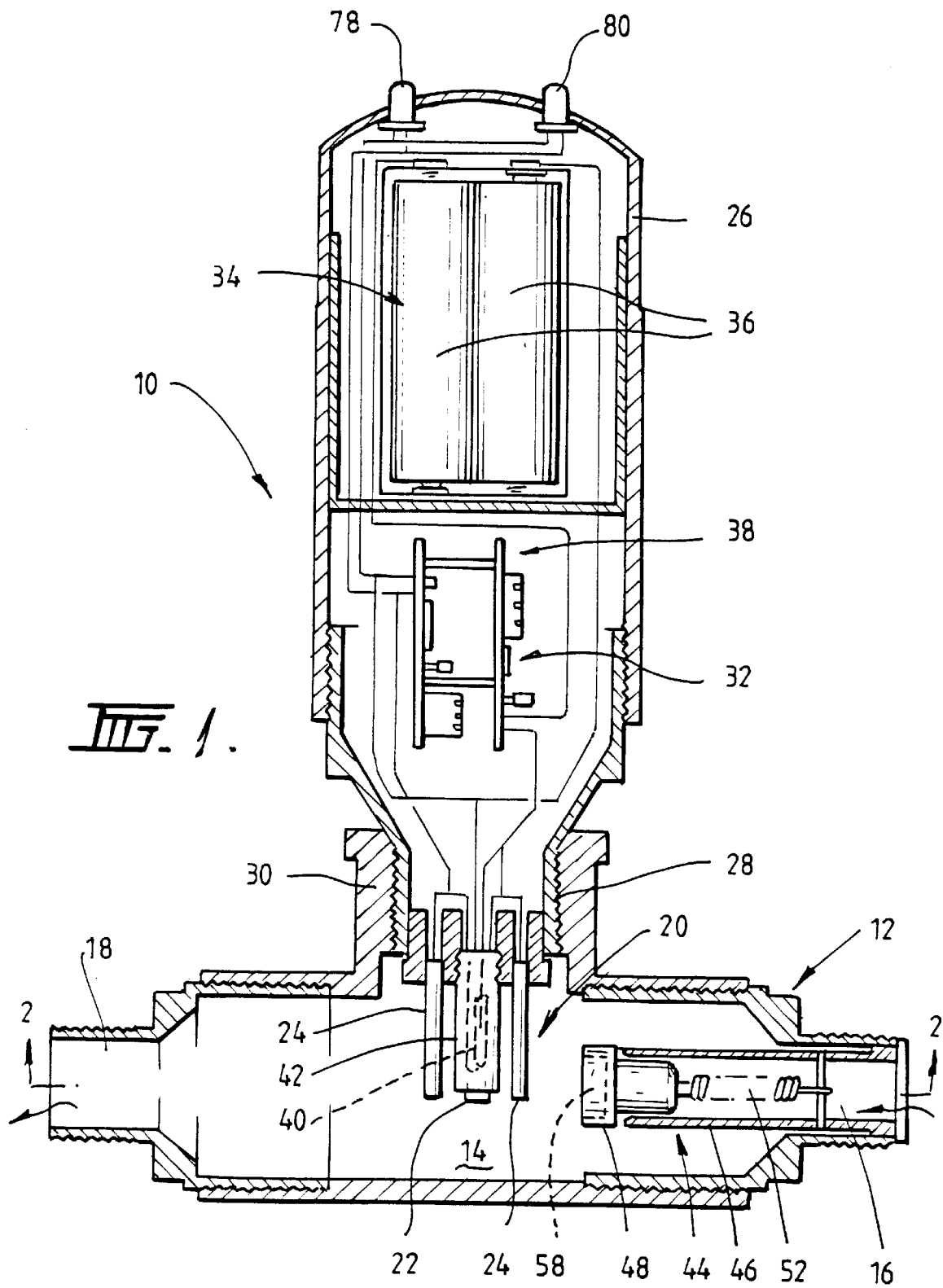
FIG. 1 is a cross-sectional side elevational view of a non-limiting example of a liquid purification apparatus made in accordance with the invention.
Figure 2:
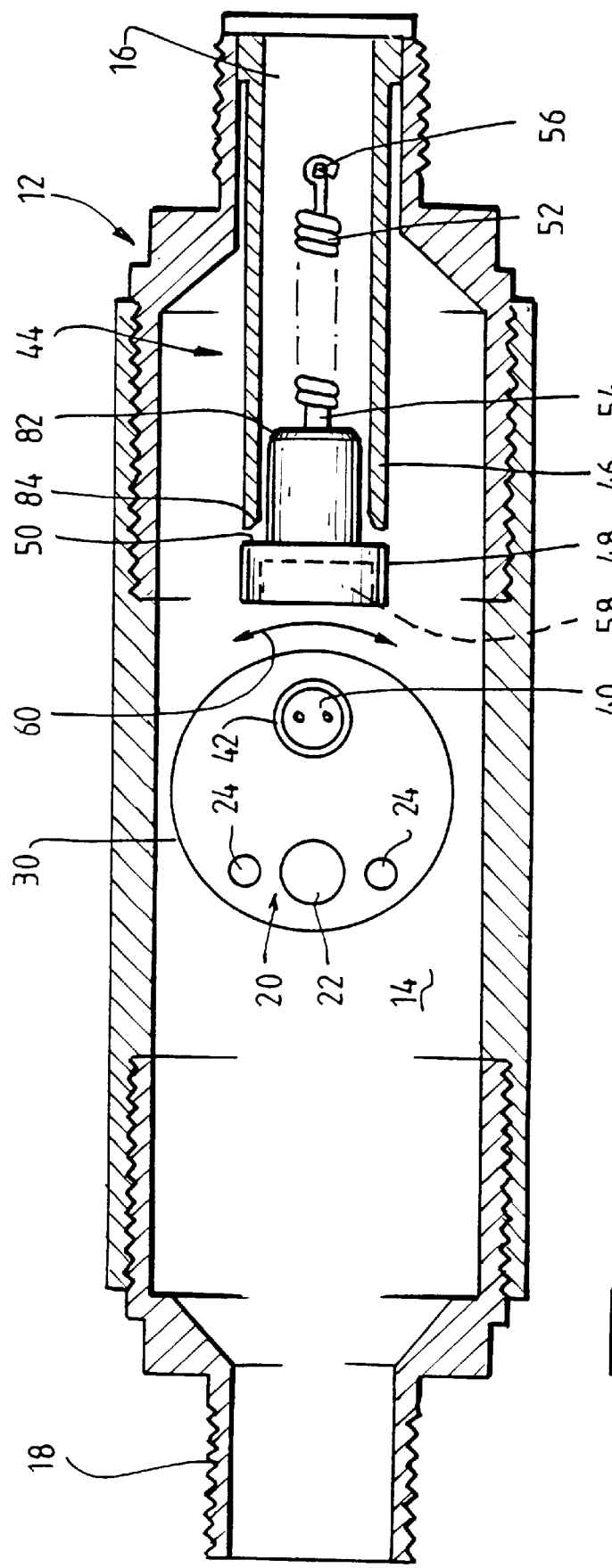
FIG. 2 is a cross-sectional view along and in the direction of arrows 2—2 of FIG. 1.

FIGS. 1 and 2 show a liquid purification apparatus 10 having a body 12 in the form of a pipe which defines a chamber 14 formed with spaced apart inlet and outlet openings 16 and 18, respectively, at opposite ends whereby liquid may be caused to flow through chamber 14 from inlet opening 16 to outlet opening 18. An electrolytic unit 20 projects into the flow path of chamber 14. In this embodiment there are three electrodes comprising a silver anode 22 and a pair of silver cathodes 24 on either side of anode 22. Although circular electrodes are shown it is clear that flat electrodes could also be used, as shown in Australian Patent No. 685630, or any other suitable shape. Electrodes 22,24 project from a housing 26 which includes a screw mounting 28 for coupling to a screw threaded socket 30 on body 12. Electric circuit means indicated generally by the numeral 32 includes power cell means 34 comprising, in this case, a power pack of four 1.5 volt "AA" batteries 36 for powering the circuitry 38 and the DC current to electrodes 22,24.

An on/off switch indicated generally at 40 is coupled to circuitry 38 and is normally inoperative so that electric circuit means 32 is switched off when liquid is not entering chamber 14 through inlet opening 16. Switch 40 is typically a reed type switch having contact members which have the known movable leaf form. The contact members are brought together by the influence of a magnetic field when a permanent magnet is moved towards the leaves. Switch 40 may be sealed within an inert sleeve 42 eg a plastics sleeve, to protect the switch and prevent any contamination effects through electrolysis.

For control of switch 40 there is provided a switch-actuating valve assembly indicated generally at 44 and mounted in inlet opening 16. Assembly 44 includes a cylindrical sleeve 46 which co-operates with body 12. A stepped piston 48 is slidably located within sleeve 46 and has shoulder 50 which can abut the inner end of sleeve 46. Piston 48 is biased by a light stainless steel tension spring 52 to occupy a position in which it closes the inlet opening 16, but it is adapted to be moved against the action of the spring 52 by the pressure of incoming liquid so that the liquid will enter and pass through the chamber 14. Spring 52 is coupled to extension 54 of piston 48 at one end and to a pin 56 at the other end. A permanent magnet 58 is fitted to the end of piston 48 to complete assembly 44. As illustrated, the parts are so made and arranged that movement of piston 48 against the action of spring 52 will cause the normally open switch 40 to activate circuitry 38. When liquid flow pressure cannot overcome the tension of spring 52 piston 48 will be pulled towards sleeve 46 to close off inlet opening 1 6 and open the contacts of reed switch 40. The movement of piston 48 away from sleeve 46 towards switch 40 and being pulled back to a stop position outside sleeve 46 prevents any debris being drawn into sleeve 46. Preferably leading edge 82 of piston 48 and inner edge 84 of cylindrical sleeve 46 are bevelled or chamfered to decrease risk of leading edge 82 being caught on inner edge 84 and thereby preventing closing off of the inlet opening 16.

By having switch 40 offset from electrodes 22,24 an adjustment for switch calibration is possible. With the continual operation of reed switch 40 there remains a possibility of the reeds or contacts becoming weak and requiring a weaker magnetic field to operate. In the embodiment shown in Australian Patent No. 685630 there was no way of making this adjustment should there be a need. However, in the present embodiment adjustment is made by simply turning housing 26 in either direction as indicated by arrows 60. Switch 40 will be moved closer or further away from magnet 58 depending on the type of adjustment necessary. This adjustment also allows for a continual on, or a continual off operation of the apparatus 10, should the need arise.

Figure 3A:
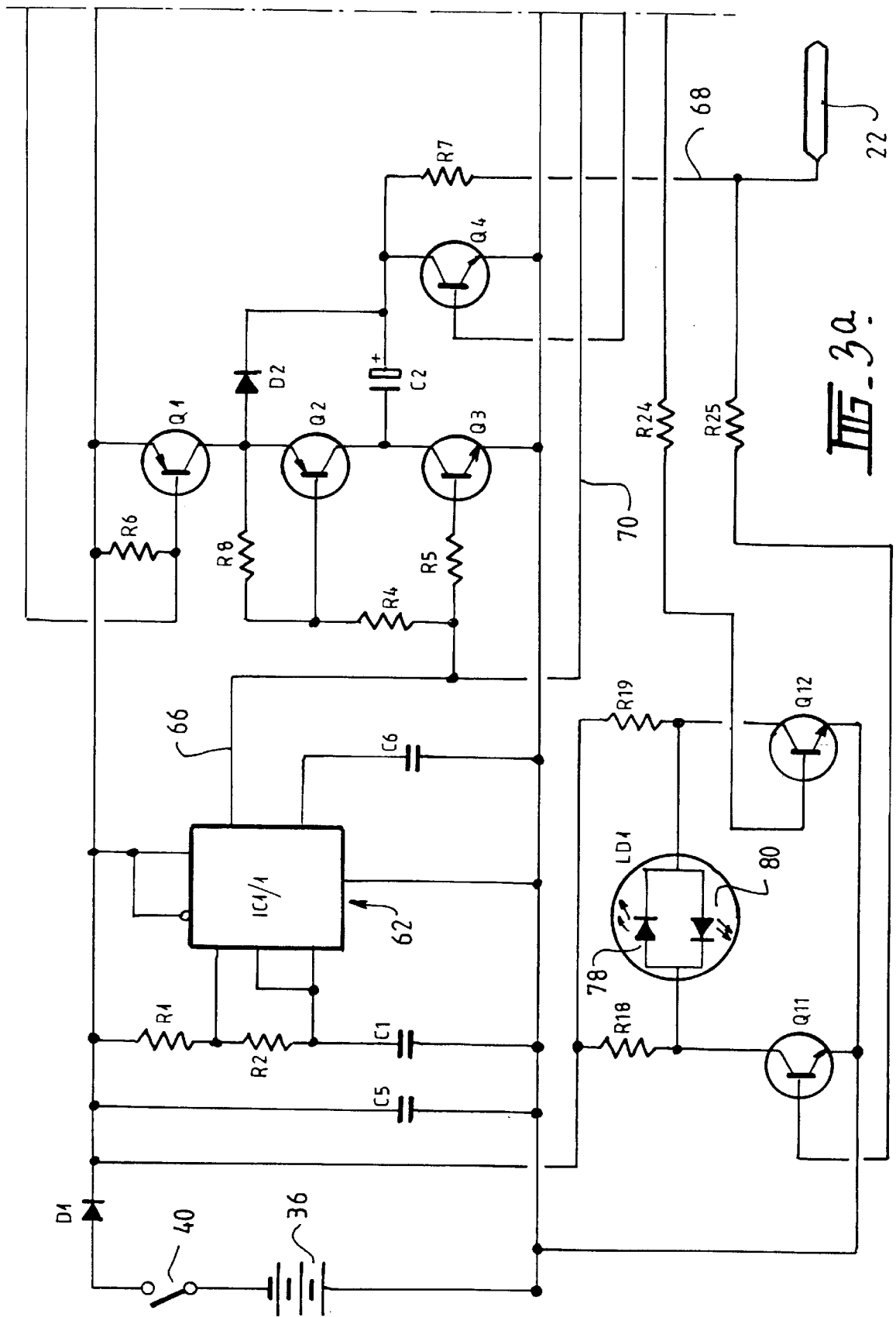
FIGS. 3a and b are circuit schematic diagrams of a first electric circuit means used with the invention.
Figure 3B:
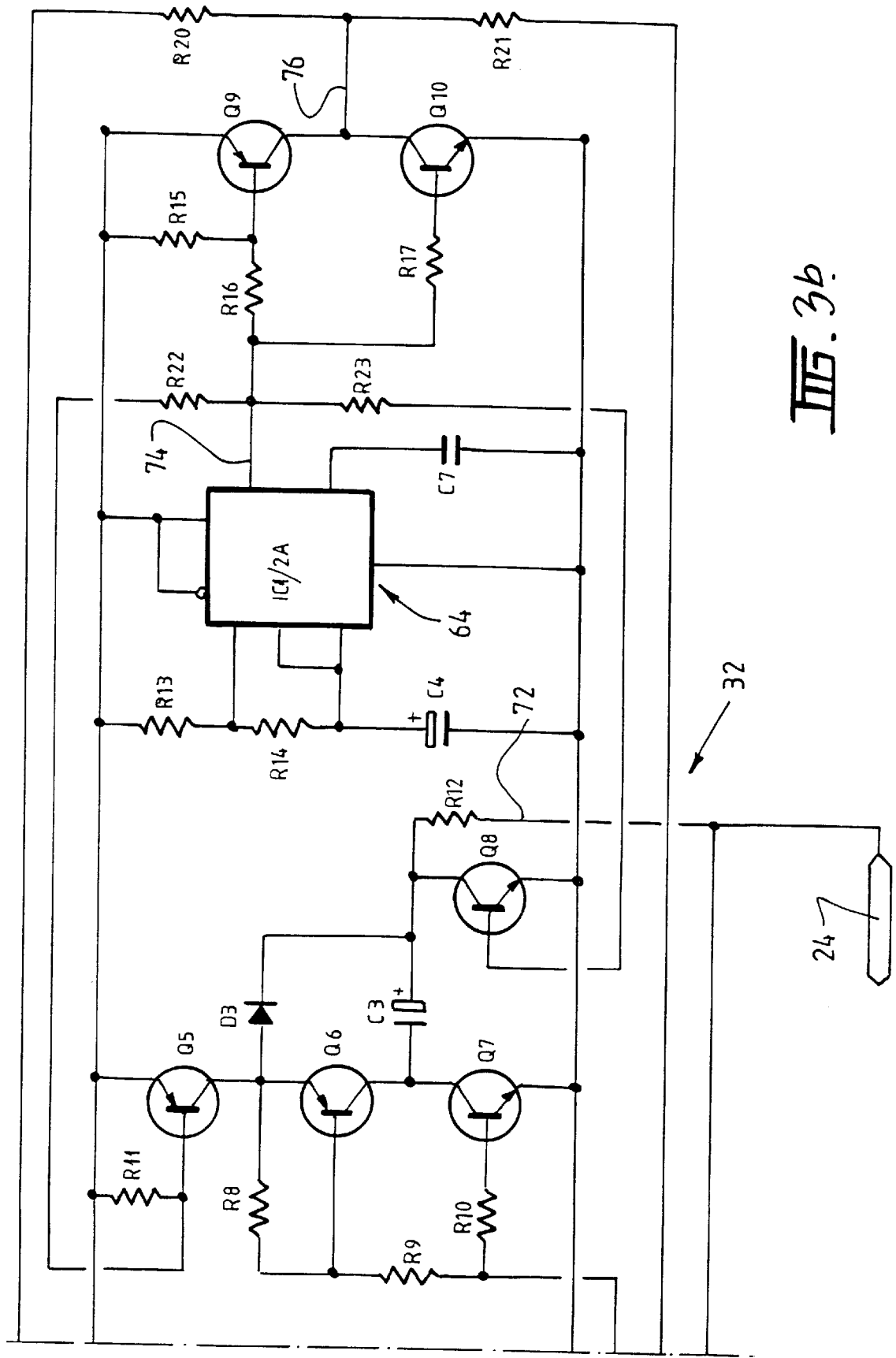

FIG. 3 shows a first embodiment of the electronics to control electrodes 22,24. The circuit includes a first timing means 62 for providing a square wave pulse to electrodes 22,24 and a second timing means 64 for providing polarity reversal on electrodes 22,24. A description of the benefits and operation of polarity reversals to electrodes 22,24 maybe found in International Patent Application No. PCT/AU96/00768 which has already been incorporated into this specification. As anodes and cathodes may attract different contaminants the use of polarity reversal provides an even wearing and self-cleaning of electrodes. In this embodiment the polarity reversal occurs at 1 to 2 seconds as opposed to 30 minutes in PCT/AU96/00768. This permits the processing of short runs of liquid, e.g., a glassful of water, while allowing polarity reversal to occur.

First timing means 62 includes a digital timer in the form of IC1 and is half of an NE556 timer running in its basic astable mode. Output 66 is typically a 10 KHz square wave which is input to transistors Q2, Q3 and amplified. A voltage doubling circuit is formed by diode D2 and capacitor C2. The unfiltered output 68 is then applied to anode 22 which follows the original input from 66 but at a DC offset. Output 66 is split at 70 to provide an input to be amplified by transistors Q6,Q7. Again a doubling circuit is formed by diode D3 and capacity C3. The unfiltered output 72 is then applied to cathodes 24.

In the polarity reversal aspect of the circuit a standard reversing current circuit is inappropriate as the voltage that needs to be switched is higher than the switching voltage available. To overcome this problem the two square wave off-set outputs 68,72 are alternatively switched on and off to give the effect that the output is being reversed.

Second timing means 64 includes the other half of IC1 and produces a 1.5 second controlling signal 74. Signal 74 is inverted through transistors Q9,Q10 to provide an inverted signal 76. Signal 74 is fed to transistors Q5 and Q8 to control output 72 whilst inverted signal 76 is fed to transistors Q1 and Q4 to control output 68. For visual indication of which one of outputs 68,72 is active two light emitting diodes (LED) 78,80 are provided. Each diode 78,80 is coupled to respective outputs 68,72.

The theory of operation of the preferred embodiment will now be described with a comparison between the prior art systems. In the prior art systems for using silver disinfection the system of electrolysis is incorporated and in all common workshop practices there is the concept of cathodes and anodes and, regardless of their configuration, the anode was the production electrode for the introduction of silver into a given liquid. In the present invention, the cathode of pure silver becomes the producer of charged silver particles or silver ions. This particular practice, to those who are skilled in the art, is commonly known as cathode sputtering. However cathode sputtering is normally carried out in a vacuum of about one ten thousands of an atmosphere, or less and the cathode is charged with a voltage from of from 1,000 to 3,000 volts. In this rarefied atmosphere positively charged gas particles move from the anode to the cathode with increasing velocity and bombard it to such an extent that small particles are torn from it. The present invention combines cathode sputtering with electrolysis and replaces the rarefied atmosphere with a liquid environment. The electrodes (cathode and anode) are of closely related distance from each other taking full advantage of the liquid environment as the electrolyte. Using a DC current to provide electrolysis, of which a square wave of the specific frequency of between 9–11 kHz, with 10 kHz being measured as the optimum, is superimposed over it. Once electrolysis commences silver particles move through the electrolyte from the anode to the cathode with increasing velocity and being highly charged with the superimposed square wave. As the highly charged particles from the anode carry a positive charge, it usually attaches to the cathode which is negatively charged. As the attachment is not a true bond the following charged particles (silver ions) moving from the anode to the cathode bombard the attached positively charged particles to such an extent that they are dislodged from the cathode. As the dislodged particles and the dislodging particles both carry a positive charge they immediately repel one another becoming suspended in the electrolyte or liquid of which they reside creating a silver colloid solution. As the bonding of the particles to the cathode is not a true bond it is understandable that the voltage used in the preferred embodiment ie 6 volts, easily replaces the 1,000–3,000 volts used in conventional vacuum cathode sputtering where the heat produced by electrical bombardment, instead of electrical resistance, accounts mainly for the disintegration of the cathode. As the process in the preferred embodiment is neither cathode sputtering alone or electrolysis alone for future reference the process may be termed Electro-cathodic Particle Dislodgment.

Figure 4:
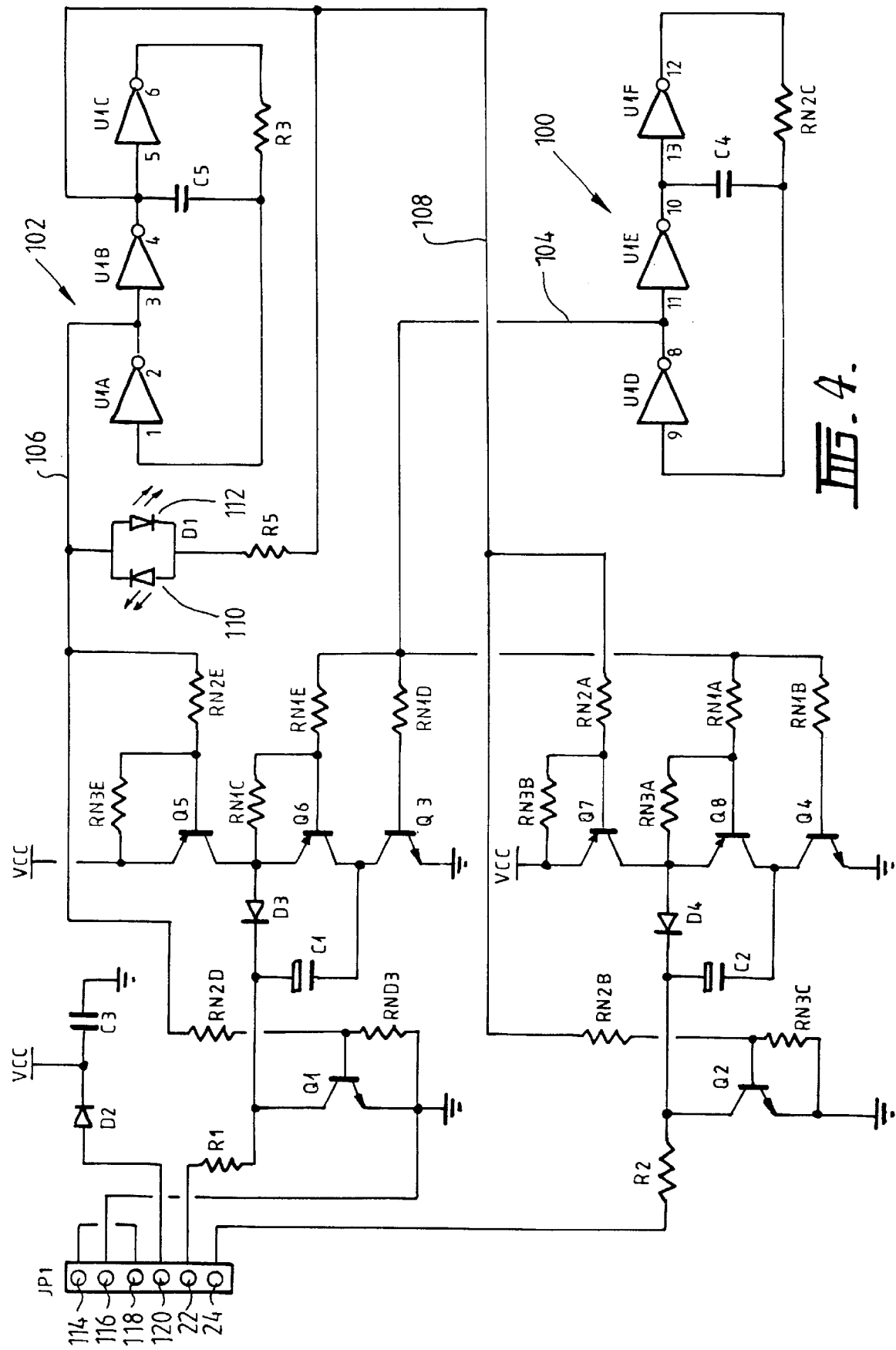
FIG. 4 is an alternative circuit schematic diagram of a second electric circuit means used with the invention.

FIG. 4 shows a second embodiment of the electronics to control electrodes 22,24. The circuit includes a first timing means 100 for providing a square wave pulse to electrodes 22,24 and a second timing means 102 for providing polarity reversal on electrodes 22,24. In this embodiment the polarity reversal occurs at 1.2 seconds.

First timing means 100 includes a digital timer formed from half of a 74HC14 Hex Schmitt trigger running as a low power oscillator using inverters U1D, U1E and U1F. Output 104 is typically a 10 KHz square wave which is input to switching transistors Q3,Q6; Q4,Q8 and amplified.

Second timing, means 102 includes the other half of the 74HC14 Hex Schmitt Trigger IC1 and produces 1.2 second controlling signals 106,108. For visual indication of which one of outputs 22,24 is active two light emitting diodes (LED) 110,112 are provided. Each diode 110,112 is coupled to respective outputs 106,108. Power is supplied from a battery (not shown) coupled to connector JP1 with positive terminal 114 and negative terminal 116. Reed switch 40 is connected to terminals 118,120.

In use, we will assume that electrode 22 is positive relative to electrode 24. Transistors Q2 and Q5 will be turned on by controlling signals 108,106 respectively to provide current flow to the electrodes 22,24 via diode D3 and resistors R1,R2. Transistors Q6, Q3 together with capacitor C1 superimpose the 10 kHz square wave output 104 to electrode 22. Polarity reversal from second timing means 102 will switch on transistors Q1 and Q7 to provide current flow to the electrodes 22,24 via diode D4 and resistors R1,R2. Transistors Q8,Q4 together with capacitor C2 superimpose the 10 kHz square wave output 104 to electrode 24.

The invention will be understood to embrace many further modifications as will be readily apparent to persons skilled in the art and which will be deemed to reside within the broad scope and ambit of the invention, there having seen set forth herein only the broad nature of the invention and certain specific embodiments by way of example.

I claim:

1. A liquid purification apparatus adapted to employ the purifying affects of the heavy metal silver under electrolysis, said apparatus including a chamber formed with spaced apart inlet and outlet openings whereby liquid may be caused to flow through the chamber from said inlet opening to said outlet opening, at least one electrolytic unit, each electrolytic unit including at least two spaced apart silver electrodes mounted in said chamber in the path of said liquid flow, at least one of said electrodes being an anode and at least one of said electrodes being a cathode, electric circuit means for controlling operation of said electrodes, said electric circuit means including a first timing means for providing a pulsed current superimposed over a DC current to said electrodes and a second timing means to cyclically reverse the polarity of said anode(s) and cathode(s) to provide a cyclic process where positively charged silver particles move from the anode(s) toward said cathode(s) to be attached to said cathode(s) and on reversal of polarity the attached positively charged silver particles are repelled to form a silver colloid solution.

2. The liquid purification apparatus of claim 1, wherein the superimposed pulsed current is at a frequency of between 9 to 11 kHz and the polarity reversal occurs every 1 to 4 seconds.

3. The liquid purification apparatus of claim 2, wherein the superimposed pulse is a square wave pulse.

4. The liquid purification apparatus of claim 2, wherein each electrolytic unit includes a single anode having a pair of cathodes at equal distances on opposite sides of said anode, said anode and cathodes being spaced apart along said liquid flow path.

5. The liquid purification apparatus of claim 2, wherein the superimposed pulsed current is at a frequency of about 10 kHz and the polarity reversal occurs every 1 to 2 seconds.

6. The liquid purification apparatus of claim 1, wherein the superimposed pulse is a square wave pulse.

7. The liquid purification apparatus of claim 6, wherein each electrolytic unit includes a single anode having a pair of cathodes at equal distances on opposite sides of said anode, said anode and cathodes being spaced apart along said liquid flow path.

8. The liquid purification apparatus of claim 1, wherein each electrolytic unit includes a single anode having a pair of cathodes at equal distances on opposite sides of said anode, said anode and cathodes being spaced apart along said liquid flow path.

9. The liquid purification apparatus of claim 8, further including a switch for activating said electric circuit means mounted within said chamber but offset from said electrodes and responsive to flow of liquid in said inlet.

10. The liquid purification apparatus of claim 8, wherein the superimposed pulse current is at a frequency of between 9 to 11 kHz and the polarity reversal occurs every 1 to 4 seconds.

11. The liquid purification apparatus of claim 9, wherein said switch is a reed type switch activated by a magnetic member on a valve within said inlet.

12. The liquid purification apparatus of claim 11, wherein said electrodes and switch are attached to a rotatable member to allow the distance between said switch and said magnetic member to be varied.

13. The liquid purification apparatus of claim 11, wherein said valve is a pressure responsive valve.

14. The liquid purification apparatus of claim 12, wherein said valve is a pressure responsive valve.

15. The liquid purification apparatus of claim 1, wherein the superimposed pulsed current is at a frequency of about 10 kHz and the polarity reversal occurs every 1 to 2 seconds.

* * * * *